United States Patent [19]

Feldman et al.

[11] 4,277,392

[45] Jul. 7, 1981

[54] THICKENING AGENTS FOR UNSATURATED POLYESTER RESIN COMPOSITIONS

[75] Inventors: Martin L. Feldman, East Brunswick; James T. De Groff, Oldwick, both of N.J.

[73] Assignee: Tenneco Chemicals, Inc., Saddle Brook, N.J.

[21] Appl. No.: 129,550

[22] Filed: Mar. 6, 1980

Related U.S. Application Data

[62] Division of Ser. No. 44,725, Jun. 1, 1979.

[51] Int. Cl.³ .................... C08G 63/76; C08L 67/00
[52] U.S. Cl. ................... 260/40 R; 525/447; 528/303
[58] Field of Search .............. 525/447; 528/303; 260/40 R

[56] References Cited

U.S. PATENT DOCUMENTS

| | | | |
|---|---|---|---|
| 3,390,205 | 6/1968 | Schnell et al. | 528/303 X |
| 3,467,619 | 9/1969 | Raichle et al. | 528/303 X |
| 3,795,717 | 3/1974 | Vargiu et al. | 525/19 |
| 3,926,898 | 12/1975 | Choi et al. | 260/40 R X |
| 4,036,908 | 7/1977 | Chretien et al. | 528/303 X |

*Primary Examiner*—Lucille M. Phynes
*Attorney, Agent, or Firm*—Evelyn Berlow

[57] ABSTRACT

A thickening agent for unsaturated polyester resin compositions comprises
 (a) 25% to 70% by weight of a Group II-A metal oxide or hydroxide and
 (b) 30% to 75% by weight of an unsaturated polyester vehicle comprising an unsaturated polyester that is the product of the reaction of a dicarboxylic acid component that contains at least one unsaturated aliphatic dicarboxylic acid and at least one saturated aromatic dicarboxylic acid with an alcohol component that contains at least one glycol and at least one monohydric alcohol.

6 Claims, No Drawings

THICKENING AGENTS FOR UNSATURATED POLYESTER RESIN COMPOSITIONS

This is a division of our copending application Ser. No. 44,725, which was filed on June 1, 1979.

This invention relates to thickening agents for unsaturated polyester resin compositions.

Polyester resin compositions that have been rendered insoluble and infusible by cross-linking are commercially important types of polymeric materials that are widely used in casting, laminating, filament winding, and other such applications in which the resin is cured in place. The cross-linked polyester resin systems are used, for example, in the manufacture of fiber reinforced compositions in which glass or other fibers are embedded in a matrix of the resin. The resulting sheet molding compounds (SMC) and bulk molding compounds (BMC) are being used with increasing frequency in compression molding operations. SMC technology always employs chemical thickening of the resin matrix during formulation, and BMC technology often employs this technique.

Chemical thickening involves the interaction of residual carboxyl and/or hydroxyl groups on the linear chains of the polyester resin with alkaline earth metal oxides and hydroxides to increase the viscosity of the uncrosslinked resin during maturation after compound preparation. Typical SMC molding viscosities range from 10–60,000,000 cps., depending upon the application. The purpose of the chemical thickening agent is to provide a tack-free SMC sheet stiff enough to permit easy handling and to provide sufficient resin viscosity to carry glass fibers to the extremities of the mold in a flow situation during crosslinking of the system. Low viscosity compounds can result in resin washing and poor carry of reinforcing fibers, particularly in large molded parts.

The alkaline earth metal oxides and hydroxides that are used as chemical thickeners can be added to the polyester resin compositions as dry powders or as dispersions in resinous vehicles. The use of dispersions is generally preferred because they protect the thickener from moisture and carbon dioxide, they are non-dusting, and they are easy to handle. Thickener dispersions that have been widely used heretofore have been made by dispersing the alkaline earth metal oxide or hydroxide in curable polyesters that have acid numbers of about 20. Because these polyesters undergo a reaction with the metal oxides and hydroxides that results in the thickening of the dispersions, the amount of the thickener that can be used in the dispersions is limited to that which will produce a handleable dispersion. For example, a dispersion of 40% by weight of magnesium oxide in a conventional polyester resin is difficult to handle because it has a putty-like consistency.

In accordance with this invention, it has been found that stable, non-thickening fluid dispersions that contain as much as 70% by weight of an alkaline earth metal oxide or hydroxide can be prepared by dispersing an alkaline earth metal oxide or hydroxide in a polyester vehicle that has a low viscosity, very low acid number, and excellent wetting properties. These dispersions, which can be poured, pumped, and metered, can be readily and uniformly incorporated into SMC and BMC formulations.

The thickening agents of this invention are dispersions of oxides and/or hydroxides of metals of group II-A of the Periodic Table of Elements in stable, low-viscosity, curable polyester vehicles that comprise unsaturated polyesters prepared by the reaction of a dicarboxylic acid that contains an unsaturated aliphatic dicarboxylic acid and a saturated aromatic dicarboxylic acid and an alcohol component that contains a glycol and a monohydric alcohol.

The unsaturated polyesters that are components of the polyester vehicles in which the chemical thickeners ae dispersed are prepared by the reaction of a dicarboxylic acid component with an alcohol component in the amounts of 0.4 mole to 0.6 mole of the dicarboxylic acid component per mole of the alcohol component. To be useful in the preparation of these unsaturated polyesters, the dicarboxylic acid component must contain from 80 to 90 mole percent of at least one unsaturated aliphatic dicaboxylic acid having 4 to 8 carbon atoms and 10 to 20 mole percent of at least one saturated aromatic dicarboxylic acid, preferably 83 to 87 mole percent of an unsaturated aliphatic acid and 13 to 17 mole percent of a saturated aromatic acid. Illustrative of the unsaturated aliphatic dicarboxylic acids that can be used in the preparation of the unsaturated polyesters are maleic, fumaric, chloromaleic, ethylmaleic, dimethylmaleic, glutaconic, itaconic, mesaconic, citraconic, acetylenedicarboxylic acids, and mixtures thereof, as well as the anhydrides, acid halides, and lower alkyl esters of these acids. Suitable aromatic acids include phthalic, isophthalic, terephthalic, tetrachlorophthalic, tetrabromophthalic, dibromotetrahydrophthalic acids, and mixtures thereof, and the corresponding anhydrides, acid halides, and lower alkyl esters. The dicarboxylic acid component preferably contains fumaric acid and isophthalic acid.

The alcohol component that is used in the preparation of the unsaturated polyesters contains 40 to 60 mole percent of at least one glycol having 2 to 6 carbon atoms and 40 to 60 mole percent of at least one monohydric alcohol having 6 to 10 carbon atoms, preferably equimolar amounts of the mono- and dihydric alcohols. Examples of the useful glycols are ethylene glycol, diethylene glycol, propylene glycol, dipropylene glycol, butanediol, hexanediol, neopentyl glycol, and dibromoneopentyl glycol. The monohydric alcohol may be, for example, n-hexanol, 2-methylpentanol-1, 2-ethylbutanol-1, neopentyl carbinol, n-heptanol, n-octanol, 2-ethylhexanol, decanol, or dodecanol. The alcohol component preferably contains ethylene glycol and 2-ethylhexanol.

The unsaturated polyesters are prepared by the conventional procedure, that is, by reacting the dicarboxylic acid component with the alcohol component at a temperature in the range of 130° C. to 220° C. in the presence of an esterification catalyst, such as p-toluenesulfonic acid or benzenesulfonic acid, and in an atmosphere of inert gas, such as nitrogen or carbon dioxide, until the desired unsaturated polyester is obtained. This polyester usually has an acid value of 0.1 to 5, preferably 0.5 to 4, and a hydroxyl value of 100 to 160, preferably 125 to 135.

The thickening agents of this invention contain from 25% to 70% by weight, usually 30% to 60% by weight, of a thickener that is an oxide or hydroxide of a metal of Group II-A of the Periodic Table of Elements in the unsaturated polyester vehicle. Suitable thickeners include the oxides and hydroxides of magnesium, calcium, strontium, and barium. For reasons of efficiency and economy, magnesium oxide, magnesium hydroxide, calcium oxide, calcium hydroxide, and mixtures thereof are the preferred thickeners.

The thickening agents are prepared by grinding a mixture that comprises the metal oxide or hydroxide and the unsaturated polyester vehicle in a ball mill, sand mill, dispersion mill, colloid mill, or high shear mixer until a uniform dispersion is obtained. In addition to the thickener and vehicle, the dispersions may contain such additives as viscosity modifiers, for example, isopropyl triisostearoyl titanate, isopropyl trimethacryl titanate, and zinc naphthenate; and acid neutralizers, for example, dimethylaminoethanol and other amines. The thickening agents prepared in this way are characterized by low viscosity, excellent stability, and compatibility with all types of polyester resins.

The unsaturated polyester resin compositions into which the thickening agents of this invention are incorporated include sheet molding compounds (SMC) and bulk molding compounds (BMC) that comprise an unsaturated polyester resin and an unsaturated monomer capable of reacting with the polyester through its unsaturated acid component to form cross-linkages.

The unsaturated polyester resins that are used in the production of these molding compounds are formed by condensing a saturated dicarboxylic acid or anhydride and an unsaturated dicarboxylic acid or anhydride with a dihydric alcohol. Illustrative of these polyester resins are the products of the reaction of a saturated dicarboxylic acid or anhydride, such as phthalic anhydride, isophthalic acid, tetrahydrophthalic anhydride, endomethylene tetrahydrophthalic anhydride, tetrachlorophthalic anhydride, hexachloroendomethylene tetrahydrophthalic acid, succinic acid, glutaric acid, adipic acid, pimelic acid, suberic acid, azelaic acid, and sebacic acid, and an unsaturated dicarboxylic acid or anhydride, such as maleic anhydride, fumaric acid, chloromaleic acid, itaconic acid, citraconic acid, and mesaconic acid, with a dihydric alcohol, such as ethylene glycol, propylene glycol, butylene glycol, diethylene glycol, triethylene glycol, and neopentyl glycol. Small amounts of a polyhydric alcohol, such as glycerol, pentaerythritol, trimethylolpropane, or sorbitol, may be used in combination with the glycol.

A three-dimensional structure is produced by reacting the unsaturated polyester with an unsaturated monomer, such as styrene, methylstyrene, dimethylstyrene, vinyltoluene, divinylbenzene, dichlorostyrene, methyl acrylate, ethyl acrylate, methyl methacrylate, diallyl phthalate, vinyl acetate, triallyl cyanurate, acrylonitrile, acrylamide, and mixtures thereof. The unsaturated polyester resin compositions generally contain 20% to 80% by weight of the monomer, with the monomer content preferably in the range of 30% to 70% by weight.

The amount of the thickening agent that is incorporated in the unsaturated polyester resin compositions is that which will result in the formation of tack-free, high viscosity molding compounds. In most cases, the amount of the thickening agent used is that which will provide from 0.5 part to 25 parts by weight, preferably 1 part to 5 parts by weight, of the alkaline earth metal oxide or hydroxide per 100 parts by weight of the unsaturated polyester resin composition.

In addition to the unsaturated polyester resin, cross-linking monomer, and thickening agent, the unsaturated polyester resin compositions of this invention may contain such conventional ingredients as free-radical polymerization catalysts, catalyst accelerators, inhibitors, stabilizers, plasticizers, flame-retardants, mold release agents, reinforcing fibers, inert fillers, pigments, and the like in the amounts ordinarily used for these purposes.

The invention is further illustrated by the following examples. In these examples, all parts are parts by weight and all percentages are percentages by weight.

EXAMPLE 1

A. A reaction mixture that contained 1.00 mole of ethylene glycol, 1.01 mole of 2-ethylhexanol, 0.91 mole of fumaric acid, 0.15 mole of isophthalic acid, and a catalytic amount of p-toluenesulfonic acid was heated at a temperature in the range of 130° to 220° C. in an atmosphere of nitrogen to form an unsaturated polyester that had an acid value of 1.9, a hydroxyl value of 110, and a viscosity of 229 cps.

B. Two hundred parts of the unsaturated polyester was thoroughly mixed with 1 part of isopropyl triisostearoyl titanate (TTS Titanate). This mixture was agitated vigorously while 200 parts of magnesium oxide (Maglite A) was added to it. Agitation was continued until a uniform, lump-free dispersion was obtained.

C. One hundred parts of a commercially-available, reactive polyester resin (Hatco Polyester G-R 13031) was mixed thoroughly with 2 parts of the 50% MgO dispersion, and the mixture was placed in an oven at 70° C. After 6 hours at 70° C. a tack-free sheet was obtained.

EXAMPLE 2

A. Two hundred parts of the unsaturated polyester whose preparation is described in Example 1A was agitated vigorously while 100 parts of magnesium oxide (Maglite A) was added to it. The agitation was continued until a uniform, lump-free dispersion was obtained.

B. Two parts of the 33% MgO dispersion was mixed thoroughly into 100 parts of a commercially-available reactive polyester resin (Hatco Polyester G-R 13031). The mixture was placed in an oven at 70° C. After 6 hours' heating, a tack-free sheet was obtained.

EXAMPLE 3

A. An unsaturated polyester was prepared by the reaction of 1.00 mole of 2-ethylhexanol, 1.15 mole of ethylene glycol, 0.89 mole of fumaric acid, and 0.15 mole of isophthalic acid. This polyester had an acid value of 1.5 and a hydroxyl value of 115.

B. A series of dispersions was prepared by thoroughly mixing 100 parts of the unsaturated polyester with varying amounts of either magnesium oxide (Maglite D) or magnesium hydroxide (Marinco H) and agitating the mixtures vigorously until uniform, lump-free, stable dispersions were obtained.

The following dispersions were prepared in this way:
1. 25% MgO in polyester
2. 30% MgO in polyester
3. 55% MgO in polyester
4. 25% Mg(OH)$_2$ in polyester
5. 40% Mg(OH)$_2$ in polyester
6. 50% Mg(OH)$_2$ in polyester
7. 60% Mg(OH)$_2$ in polyester C. When 2 parts of each of these dispersions was mixed thoroughly with 100 parts of a 30% styrenated polyester resin (U.S. Steel Corp. Polyester Resin USS MR 941) and the resulting mixture was heated at 70° C., a tack-free sheet was obtained in 8 hours or less.

The procedure described in Example 3 can also be used to produce thickener dispersions that contain from 30% to 60% of calcium oxide, calcium hydroxide, strontium oxide, strontium hydroxide, barium oxide, barium hydroxide, or mixtues of each of these compounds with magnesium oxide and/or magnesium hydroxide.

What is claimed is:

1. A thickening agent for unsaturated polyester resin compositions that comprises
    (a) 25% to 70% by weight of a thickener that is a Group II-A metal oxide or hydroxide and
    (b) 30% to 75% by weight of an unsaturated polyester vehicle comprising an unsaturated polyester that is the product of the reaction of a dicarboxylic acid component containing 80 to 90 mole % of at least one unsaturated aliphatic dicarboxylic acid having 4 to 8 carbon atoms and 10 to 20 mole % of at least one saturated aromatic dicarboxylic acid with an alcohol component containing 40 to 60 mole % of at least one glycol having 2 to 6 carbon atoms and 40 to 60 mole % of at least one monohydric alcohol having 6 to 12 carbon atoms, in the amount of 0.4 mole to 0.6 mole of the dicarboxylic acid component per mole of the alcohol component.

2. A thickening agent for unsaturated polyester resin compositions as defined in claim 1 that contains 30% to 60% by weight of the thickener.

3. A thickening agent for unsaturated polyester resin compositions as defined in claim 1 wherein the thickener is magnesium oxide.

4. A thickening agent for unsaturated polyester resin compositions as defined in claim 1 wherein the thickener is magnesium hydroxide.

5. A thickening agent for unsaturated polyester resin compositions as defined in claim 1 wherein the unsaturated polyester vehicle contains an unsaturated polyester that is the product of the reaction of a dicarboxylic acid component containing 83 to 87 mole % of fumaric acid and 13 to 17 mole % of isophthalic acid with said alcohol component.

6. A thickening agent for unsaturated polyester resin compositions as defined in claim 1 wherein the unsaturated polyester vehicle contains an unsaturated polyester that is the product of the reaction of said dicarboxylic acid component with an alcohol component that contains equimolar amounts of ethylene glycol and 2-ethylhexanol.

* * * * *